(12) United States Patent
Rohner et al.

(10) Patent No.: US 9,590,471 B2
(45) Date of Patent: Mar. 7, 2017

(54) ROTARY LIFTING DEVICE

(71) Applicant: NTI AG, Spreitenbach (CH)

(72) Inventors: Ronald Rohner, Widen (CH); Ernst Blumer, Zurich (CH)

(73) Assignee: NTI AG, Spreitenbach (CH)

( * ) Notice: Subject to any disclaimer, the term of this patent is extended or adjusted under 35 U.S.C. 154(b) by 328 days.

(21) Appl. No.: 14/079,980

(22) Filed: Nov. 14, 2013

(65) Prior Publication Data

US 2014/0139050 A1    May 22, 2014

(30) Foreign Application Priority Data

Nov. 16, 2012   (EP) ..................... 12192962

(51) Int. Cl.
| | |
|---|---|
| H02K 41/02 | (2006.01) |
| H02K 7/06 | (2006.01) |
| H02K 7/10 | (2006.01) |
| H02K 7/116 | (2006.01) |
| H02K 41/03 | (2006.01) |
| H02K 16/00 | (2006.01) |
| H02K 7/00 | (2006.01) |
| H02K 21/14 | (2006.01) |

(52) U.S. Cl.
CPC .............. *H02K 7/116* (2013.01); *H02K 7/00* (2013.01); *H02K 16/00* (2013.01); *H02K 41/02* (2013.01); *H02K 41/031* (2013.01); *H02K 21/14* (2013.01); *H02K 2201/18* (2013.01)

(58) Field of Classification Search
CPC ...................................................... H02K 7/00
USPC .............................. 310/12.14, 12, 24, 80, 83
See application file for complete search history.

(56) References Cited

U.S. PATENT DOCUMENTS

| | | | | |
|---|---|---|---|---|
| 6,433,447 | B1 * | 8/2002 | Kitazawa | ................. H02K 7/20 310/12.14 |
| 6,499,989 | B2 * | 12/2002 | Koide | ..................... B29C 45/42 264/334 |
| 7,091,679 | B2 * | 8/2006 | Schroeder | ............ H02K 41/031 310/12.24 |

FOREIGN PATENT DOCUMENTS

| | | |
|---|---|---|
| DE | 10 2007 021 322 A1 | 11/2008 |
| DE | 10 2010 028 872 A1 | 11/2011 |
| EP | 2 523 320 A1 | 11/2012 |

OTHER PUBLICATIONS

"Units Baureihe CPU,"(catalog), pp. 98 to 111; 122, 123; 130, 131); available at www.harmonicdrive.de, retrieved on or around May 24, 2013.

(Continued)

*Primary Examiner* — Jose Gonzalez Quinones
(74) *Attorney, Agent, or Firm* — Kilpatrick Townsend & Stockton LLP

(57) ABSTRACT

A rotary lifting device comprises an actuator shaft, a linear motor and a rotary motor for moving and rotating the actuator shaft about the longitudinal axis thereof. The rotary motor has a hollow rotor, through which the actuator shaft extends and which is kinematically coupled to the actuator shaft in terms of rotation. The linear motor has an armature coaxially arranged with respect to the actuator shaft and kinematically coupled to the actuator shaft at a first longitudinal end thereof. A step-down gear is arranged at a second longitudinal end of the actuator shaft and is capable of being moved in an axial direction relative to the rotary motor. The step-down gear is kinematically coupled to the actuator shaft at the drive side, both with respect to axial movement of the actuator shaft and with respect to rotating movement of the actuator shaft.

9 Claims, 3 Drawing Sheets

(56) References Cited

OTHER PUBLICATIONS

"Backlash Free-Geared-Motors with Integrated Controllers" (data sheet), Aug. 7, 2010, issue No. LD0097-01GB, pp. 1-12, JVL Industri Elektronik A/S, Blokken 42, DK-3460 Birkerod/Denmark, www.jvl.dk.
"TwinSpin TS50" (data sheet), 2 pages, preliminary version II/2009, (2009), Spinea, s.r.o.; Okrajova 33, 08005 Presov, Slovakia, www.spinea.sk.

* cited by examiner

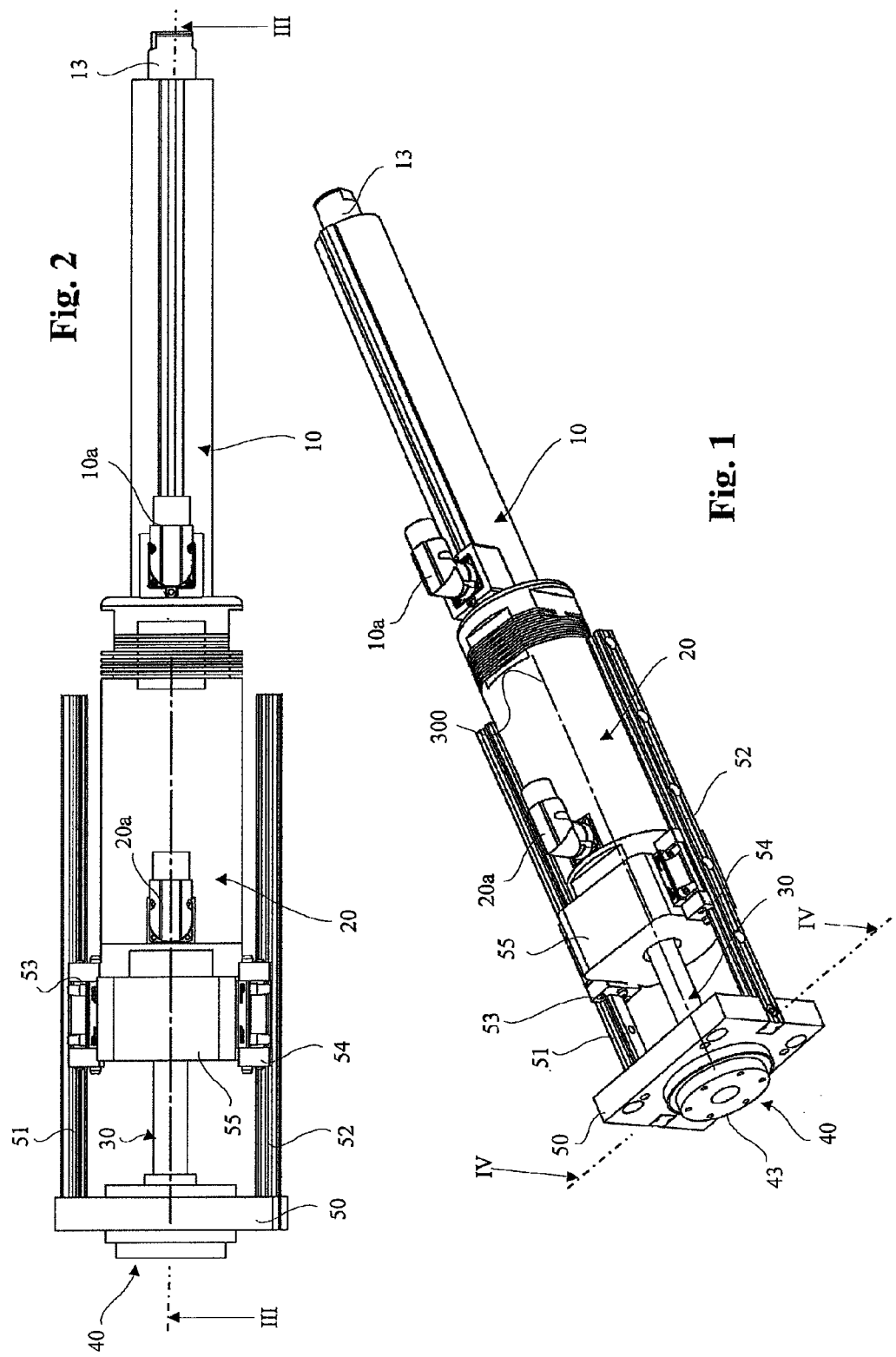

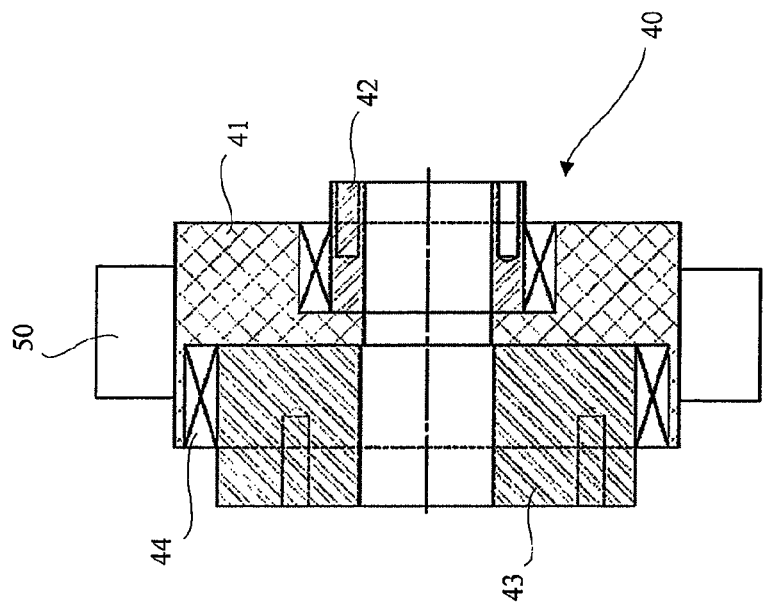
Fig. 7
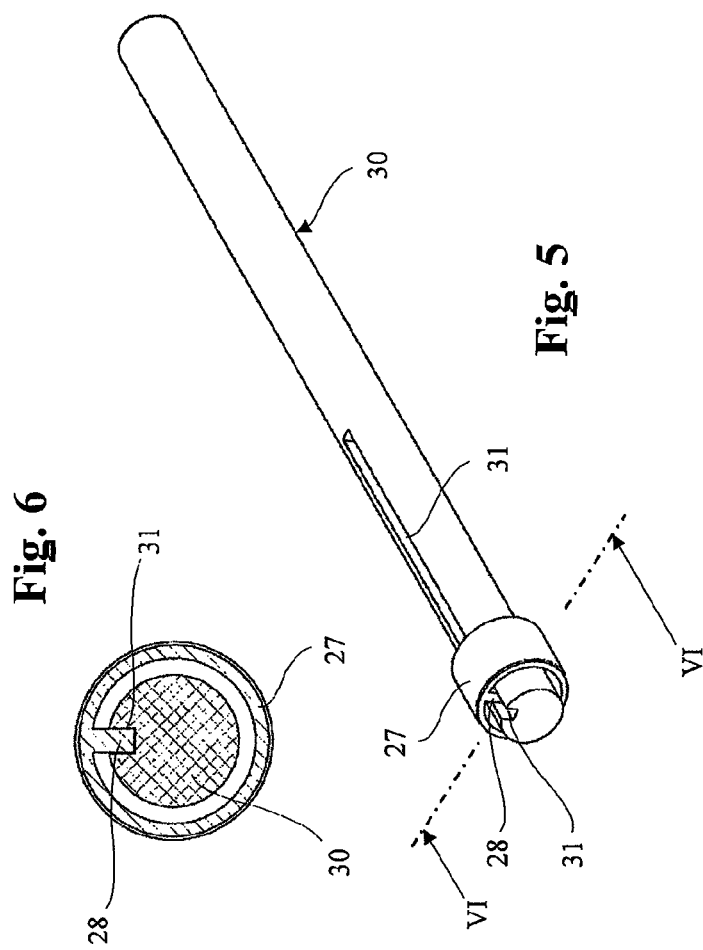
Fig. 5
Fig. 6

ROTARY LIFTING DEVICE

This application claims the priority of European Application No. 12 19 2962.4, filed on Nov. 16, 2012, the disclosure of which is incorporated herein by reference.

The present invention relates to a rotary lifting device according to the independent patent claim.

Combined linear/rotary movements are used in a plurality of applications in automation technology. The screwing-in of a screw or the screwing of a lid onto a container may be cited as examples. Often, a product or a production component must also be rotated by a specific angle, for which purpose it has to be gripped, lifted, rotated and subsequently set down again. For such combined linear/rotary movements, in many instances rotary lifting devices are used.

A known rotary lifting device comprises a tubular linear motor which is, for example, permanently excited and a rotary motor which is fitted to the linear motor in a coaxial manner, as well as an actuator shaft which can be driven by the linear motor and the rotary motor and the free end of which serves to mount a manipulation tool. The linear motor comprises a hollow tubular stator, and an armature which can be axially displaced in this stator and in which the permanent magnets of the linear motor are arranged. The rotary motor substantially comprises a fixed stator winding and a hollow (inner) rotor which is arranged within the stator winding. In the case of a permanently excited rotary motor the rotor comprises, for example, a hollow shaft having permanent magnets adhesively bonded to the hollow shaft. The actuator shaft extends through the hollow shaft (rotor) of the rotary motor and is supported inside the rotor. Furthermore, the actuator shaft is coupled to the armature of the linear motor (both in terms of pulling and pushing) in an axial direction in such a manner that the linear movement of the armature is transmitted directly to the actuator shaft. The coupling of the armature of the linear motor to the actuator shaft is embodied in a manner such that a rotational movement of the actuator shaft is not transmitted to the armature of the linear motor. Through a mechanical coupling, the rotor of the rotary motor is rotationally coupled to the actuator shaft so that a rotational movement of the rotor of the rotary motor is transmitted to the actuator shaft. The coupling of the rotor of the rotary motor to the actuator shaft is embodied in a manner such that the actuator shaft can be moved in an axial direction, however, without concurrently moving the rotor in the axial direction. Such a mechanical coupling which transmits the rotation of the rotor to the actuator shaft may comprise, for example, a carrier which is connected to the rotor in a rotationally secure manner in the form of a ring having a radially inwardly protruding projection and which engages in a longitudinal groove provided on the actuator shaft and extending parallel to the longitudinal axis of the actuator shaft so that the projection can slide in this longitudinal groove. Consequently, a torque can be transmitted from the rotor to the actuator shaft, and at the same time the actuator shaft can carry out an axial (linear) movement over the length of the longitudinal groove. In order to transmit larger torques, the carrier ring may also be provided with two or more such projections and the actuator shaft and, correspondingly, the actuator shaft may be provided with two or more longitudinal grooves. The rotary motor is generally provided with an integral sensor system for detecting the rotary position of the rotor and, consequently, of the actuator shaft. The linear motor is also provided with an integral sensor system for detecting the axial position of the armature and, consequently, of the actuator shaft.

In applications such as, for example, the screwing of lids onto bottles, such rotary lifting devices are arranged beside each other or are placed on a rotary plate so that the compact and slim arrangement is a great advantage. In such applications, the rotational moment of inertia of the load (for example, lid plus lid retention member) in comparison with the rotational moment of inertia of the rotatably moved components of the rotary lifting device is also relatively small, or is in a reasonable ratio thereto. In addition, in such applications the centre of rotation of the load is arranged on the longitudinal axis of the actuator shaft (rotation axis of the rotary lifting device) so that the rotational moment of inertia of the component to be moved is not increased by the rule of the parallel axis theorem.

In assembly and handling devices, it is often necessary to displace a product or a production component through a rotational movement along a circular path. For that purpose it must be gripped, lifted, rotated and subsequently set down again ("pick-and-place"). During these rotary lifting movements, the component to be moved is located at a non-negligible radial distance from the rotation axis of the rotary lifting device. The rotational moment of inertia thus rapidly becomes very large as a consequence of the parallel axis theorem which has to be applied. The following example is intended to demonstrate this. A cylindrical component having a radius of r=4 cm and a mass of m=1 kg has a rotational moment of inertia with respect to the longitudinal axis thereof of $J=\frac{1}{2}\cdot m\cdot r^2=0.0008$ kgm². If the same cylindrical component is mounted to a lever arm having a length of a=50 cm (spacing of the longitudinal axis of the cylindrical component from the rotation axis), there is a rotational moment of inertia of $J=\frac{1}{2}\cdot m\cdot r^2+m\cdot a^2=0.2508$ kgm². The rotational moment of inertia of the lever arm itself adds thereto. Such a rotational moment of inertia is immediately larger than the rotation moment of inertia of the rotary motor in the rotary lifting device by several orders of magnitude.

Typically, the ratio of the rotational moment of inertia of the rotary motor with respect to the rotational moment of inertia of the load should be in the range from 1:10 to a maximum of 1:30 (optimal case is 1:1), since otherwise significant technical problems arise in terms of control. In addition to the in many aspects unattractive method of selecting a rotary motor of a sufficiently large size, a so-called load adaptation operation is typically carried out by means of a step-down gear mechanism. A gear having the step-down ratio i:1 (i>1) reduces the rotational moment of inertia transmitted to the drive side by the load arranged at the output side by the factor $1/i^2$. At the same time, the rotational speed of the rotary motor is reduced at the output side (load side) by the factor 1/i, whereas the available torque is increased by the factor i. Planetary gears or cyclo gears are often used for such step-down operations, since in these types of gears the drive and output shafts are arranged in a coaxial manner and, consequently, very high step-down ratios can be achieved in a comparatively small constructional space.

The method of load adaptation explained above may in principle also be used in a rotary lifting device. To this end, the cyclo or planetary gear may be directly flange-mounted to the rotary motor and may be arranged between the rotary motor and the linear motor. In addition to the rotary motor, cyclo or planetary gears having a hollow shaft are also used, the actuator shaft extending both through the hollow shaft (rotor) of the rotary motor and through the gear. The hollow shaft (rotor) of the rotary motor is connected to the input side of the gear (drive side) in a rotationally secure manner, whilst the carrier ring of the mechanical coupling having the carrier projection is connected to the output side (driven side) of the gear in a rotationally secure manner. Such a rotary lifting device would consequently be extended only by the (axial) length of the gear mechanism.

However, a significant problem in the technical implementation of such a rotary lifting motor with load adaptation exists in the configuration of the mechanical coupling, which is required in order to transmit the rotational movement of the rotor of the rotary motor to the actuator shaft (which is arranged in an axially movable manner). In industrial applications, several million reversing and simultaneous rotary and linear movements are required. The mechanical play between the carrier projection and the groove in each case should be in the range of only a few hundredths of a millimeter over the full length of the groove. This is because, on the one hand, the rotary positioning precision is dependent thereon and, on the other hand, an excessively large play between the carrier projection and groove leads to increased mechanical stress to the carrier projection and the side walls of the groove due to impacts.

The ideal loading of the mechanical coupling is calculated from the product of the surface pressure and the linear speed between the carrier projection and the groove side wall.

Whilst the linear speed cannot be influenced since it is determined by the respective application of the rotary lifting device, the surface pressure may be influenced through the construction. The side face of the carrier projection should be as large as possible from the point of view of the loading of the mechanical coupling. A larger side face of the carrier projection can be achieved in three ways. For example, the height of the carrier projection can be increased. As a consequence, however, the depth of the groove in the actuator shaft must also be increased then. However, a larger depth of the groove in the actuator shaft results in the actuator shaft having to have a larger diameter, which is not possible in each case since the maximum diameter of the through-hole in the hollow shaft (rotor) of the rotary motor is limited and the actuator shaft must extend through the hollow shaft. Another possibility is to increase the length of the carrier projection. If the length of the carrier projection is increased, this leads to a reduced linear travel for the same length of the groove in the actuator shaft. An extension of the groove, however, leads to an increase in size of the entire rotary lifting device since, for technical reasons related to bearings, the entire length of the actuator shaft is not available for the groove. Another possibility, as already mentioned above, involves the provision of a plurality of grooves in the actuator shaft and, accordingly, of a plurality of carrier projections thereby increasing the entire side face (abutment face). Assuming an optimum selection of the material used for the carrier projections and the actuator shaft, however, the maximum torque resistance of the mechanical coupling is determined by the constructional size of the rotary lifting motor and cannot be increased arbitrarily.

Taking into consideration the approach explained above of load adaptation by means of a planetary or cyclo gear directly fitted to the rotary motor, it can be seen that a torque which is greater by the factor i of the stepping-up/stepping-down action of the gear further acts on the mechanical coupling which is arranged at the output side (that is to say, at the gear output), whereby the torque to be transmitted from the coupling to the actuator shaft is again increased by the factor i. Although the rotational speed is also reduced by the factor 1/i at the same time, this has no influence on the loading of the mechanical coupling, as already explained above. Due to the maximum possible torque loading of the mechanical coupling, consequently, the maximum factor i of the stepping-up/stepping-down action or the possible load adaptation are significantly limited.

Another approach involves constructing the rotary motor including the flange-mounted step-down gear in a manner so as to be displaceable as a whole, and displacing it by means of the linear motor, wherein the actuator shaft (via the gear mechanism) would then be connected only to the rotary motor, since the linear (axial) movement is transmitted to the rotary motor as a whole (including the actuator shaft). The mechanical (sliding) coupling described and the problems connected therewith would thereby be overcome.

However, this approach is disadvantageous in many aspects. Firstly, the mass which must be moved linearly now comprises the complete rotary motor including the gear. Consequently, a significantly more powerful (larger) linear motor must be used in order to achieve the same result in operation. Secondly, all the electrical supply lines and sensor system cables which are necessary for the operation of the rotary motor have to be constructed as drag chain cables (since they are always moved), and even after a few million lifting operations they already have to be replaced for maintenance reasons. Thirdly, an integrated construction type is no longer possible and the entire rotary lifting device loses the advantage of the space-saving construction, it becomes significantly more unmanageable and can no longer be so readily incorporated in machines or other devices.

An object of the invention is to provide a space-saving rotary lifting device while at the same time preventing the disadvantages described above.

This object is achieved according to the invention by a rotary lifting device as it is specified by the features of the independent claim. Additional advantageous aspects will become apparent from the features of the dependent claims.

The rotary lifting device according to the invention comprises an actuator shaft having a longitudinal axis, a linear motor for moving the actuator shaft in the direction of the longitudinal axis thereof, and a rotary motor for rotating the actuator shaft about the longitudinal axis thereof. The rotary motor has a hollow rotor, through which the actuator shaft extends and which is kinematically coupled to the actuator shaft in terms of rotation. The linear motor is arranged in a fixed manner relative to the rotary motor and has an armature which is arranged coaxially with respect to the actuator shaft extending through the rotor of the rotary motor (the longitudinal axis of the actuator shaft and the longitudinal axis of the armature are identical). The armature is kinematically coupled to a first longitudinal end of the actuator shaft with respect to the movement of the actuator shaft in the direction of the longitudinal axis thereof. The rotary lifting device further comprises a step-down gear. The step-down gear is arranged at a second longitudinal end of the actuator shaft and is arranged so as to be able to be moved relative to the rotary motor in the direction of the longitudinal axis of the actuator shaft. The step-down gear is kinematically coupled to the actuator shaft at the drive side of the step-down gear, both with respect to a movement in the direction of the longitudinal axis of the actuator shaft and with respect to a rotary movement about the longitudinal axis of the actuator shaft.

With the rotary lifting device according to the invention, the load adaptation of the rotary motor thus is not effected ahead of the mechanical rotary coupling between the rotor of the rotary motor and the actuator shaft, but rather is effected behind this mechanical rotary coupling. The loading of the mechanical rotary coupling used is thereby significantly reduced. In addition, a series of other advantages is thereby achieved which are described in detail below.

According to an advantageous aspect of the invention, the step-down gear is adapted (constructed) so as to transmit axial forces, which are to be understood as being forces in the direction of the longitudinal axis of the actuator shaft, to the actuator shaft. The gear can thus transmit axial forces acting on the gear to the actuator shaft, and these forces are then transmitted via the kinematic coupling of the actuator shaft and the armature of the linear motor to the armature of the linear motor, so that such axial forces may optionally be compensated for by the linear motor. Conversely, axial forces are transmitted in this manner from the linear motor to the load.

According to another advantageous aspect of the invention, the step-down gear comprises a gear housing, and this gear housing (and consequently the gear as a whole) is arranged in a rotationally secure manner relative to the rotary motor. The term "rotationally secure" is intended to be understood such that the gear housing or the step-down gear as a whole, due to torques acting at the output and/or the drive side during operation, is not permitted to rotate at all or at most is permitted to rotate only for a negligible angle with respect to the required rotational position accuracy so that the required degree of rotational position accuracy is maintained.

According to another advantageous aspect of the invention, the step-down gear is arranged relative to the longitudinal axis of the actuator shaft in a manner resistant against transverse forces. The term "resistant against transverse forces" is intended to be understood such that the step-down gear as a whole, due to transverse forces acting in operation on the gear transversely relative to the longitudinal axis of the actuator shaft (lateral forces, in particular forces acting perpendicularly relative to the longitudinal axis of the actuator shaft), is not permitted to move or is permitted to move transversely relative to the longitudinal axis of the actuator shaft only to a negligible extent, so that proper operation of the rotary lifting device is maintained (movability of the actuator shaft).

According to another advantageous aspect of the invention, the step-down gear is arranged relative to the longitudinal axis of the actuator shaft in a manner resistant against tilting. The term "resistant against tilting" is to be understood such that the step-down gear as a whole, due to tilting moments acting on the gear mechanism during operation, is not permitted to be tilted or is permitted at the most to be tilted relative to the longitudinal axis of the actuator shaft to a negligible extent so that proper operation of the rotary lifting device is maintained (movability of the actuator shaft).

According to another advantageous aspect of the invention, the step-down gear or the gear housing, respectively, is arranged in a plate, which is arranged so as to be able to be moved relative to the rotary motor in the direction of the longitudinal axis of the actuator shaft. Due to the arrangement of the step-down gear in a plate, the rotationally secure, transverse-force-resistant and tilting-resistant arrangement of the step-down gear can be achieved in a simple manner from a constructional point of view.

In particular, the plate may be connected for this purpose to at least one rail which is arranged parallel to the longitudinal axis of the actuator shaft, in particular to two rails, with the rail or rails being supported in a guide or guides which is/are secured to a housing of the rotary motor, and with the rails being displaceably arranged parallel to the longitudinal axis of the actuator shaft. More than two such parallel rails and a corresponding number of guides may also be provided. This is a structurally simple and space-saving variant of the rotary lifting device according to the invention.

The plate, the rails and the guides and the housing of the rotary motor are advantageously constructed in such a stable manner that transverse forces and tilting moments acting on the gear during operation are received by the plate, the rails and the guides and can be directed into the housing of the rotary motor (and from there into the fixation thereof) and consequently do not act on the actuator shaft.

According to another advantageous aspect of the invention, the step-down gear has at the output side a disc or a rotary plate as an output, to which even relatively large protruding load masses, such as lever arms and the like, can be directly secured. For that purpose, the output is supported in appropriately sized ball bearings.

The invention is described in greater detail below with reference to an embodiment of the rotary lifting device illustrated in the drawings, in which:

FIG. 1 is a perspective view of an embodiment of the rotary lifting device according to the invention;

FIG. 2 is a plan view of the rotary lifting device of FIG. 1;

FIG. 5 is a perspective view of a detail of the rotary lifting device of FIG. 1;

FIG. 6 is a section of a detail along line VI-VI in FIG. 5; and

FIG. 7 is a schematic axial section through a planetary gear of the rotary lifting device of FIG. 1.

Figure 3:
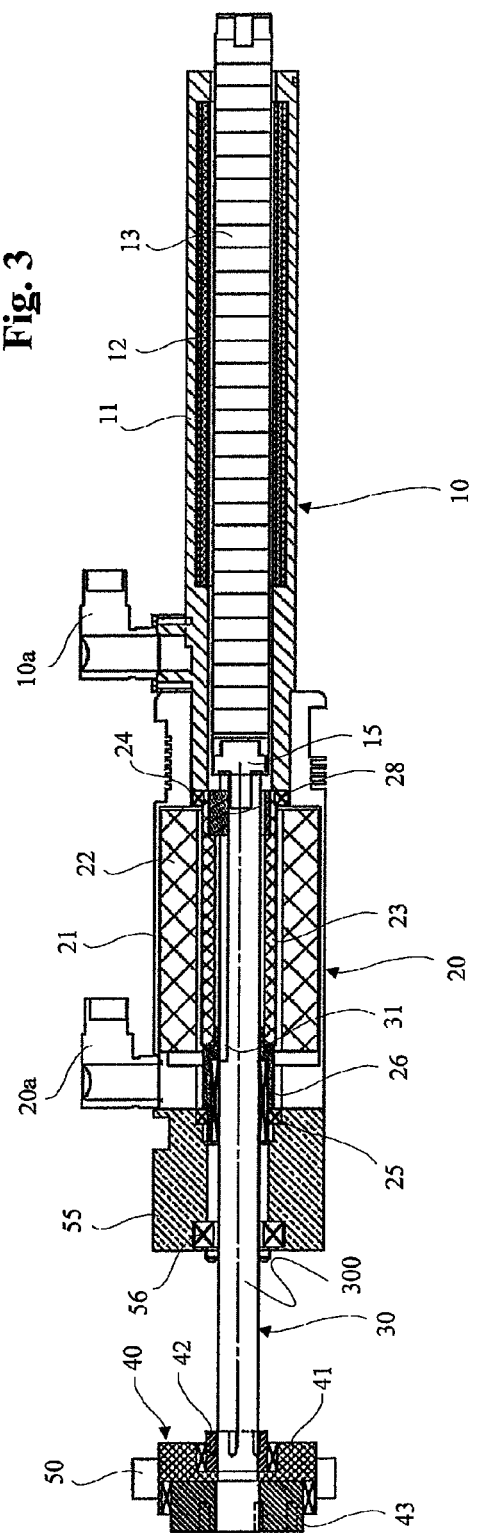
FIG. 3 is a longitudinal section along line in FIG. 2.

The following statement applies to the following description. If reference numerals are set out in a Figure for the purposes of clarity of illustration, but are not mentioned in the directly associated portion of the description, reference is made to the explanation thereof in the preceding or following portions of the description. Conversely, in order to prevent excessive illustrative complexity for direct understanding, less relevant reference numerals have not been indicated in all the Figures. Reference is then made to the rest of the Figures.

The embodiment of the rotary lifting device according to the invention illustrated by way of example in FIG. 1-FIG. 4 comprises as the most important components a linear motor 10, a rotary motor 20, an actuator shaft 30 and a gear 40, which is preferably constructed as a planetary gear or as a cyclo gear. The linear motor 10 comprises a connection 10a for the current supply thereof, and the rotary motor 20 also comprises a connection 20a of the current supply thereof. The rotary motor 20 is flange-mounted to the linear motor 10 in a coaxial manner.

Figure 4:
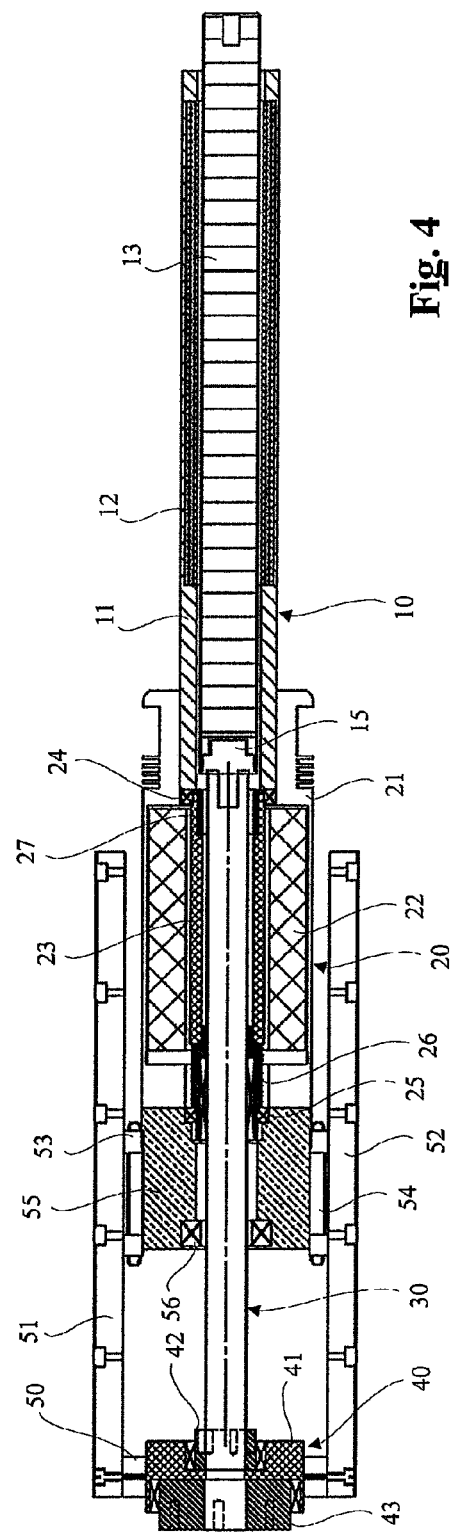
FIG. 4 is a longitudinal section along plane IV-IV in FIG. 1.

The more detailed construction of the linear motor 10 and of the rotary motor 20 can be seen from the sectioned illustrations in FIG. 3 and FIG. 4.

The linear motor 10 comprises a pipe-like (tubular) housing in which a stator 12 having electrical windings is arranged. In the interior of the housing 11 inside the stator 12, an armature 13 is coaxially arranged and slidably supported. In the armature 13, for example, permanent magnets are arranged. The linear motor 10 further comprises a sensor system (position detector) which is not illustrated for detecting the axial position of the armature 13 relative to the stator 12. So far the structure of the linear motor 10 is conventional and therefore requires no further explanation.

The rotary motor 20 comprises a housing 21 in which a stator 22 having electrical windings is arranged. Furthermore, in the housing 21 a tubular rotor 23 extending coaxially through the stator 22 is rotatably supported in two rotary bearings 24 and 25. The rotary motor 20 is preferably (but not necessarily) constructed as a permanently excited motor, the rotor 23 being constructed substantially as a hollow shaft having adhesively-bonded permanent magnets. The rotary motor further comprises a sensor system (position detector) which is not illustrated for detecting the rotation position of the rotor 23 relative to the stator 22. So far the structure of the rotary motor 20 is conventional and therefore requires no further explanation.

The linear motor 10 and the rotary motor 20 are (releasably) connected to each other by means of their housings 11 and 21, and aligned with respect to each other in a manner such that the movement axis of the armature 13 and the rotation axis of the rotor 23 are located in a straight line, that is to say, the armature 13 and the rotor 23 are arranged coaxially.

The actuator shaft 30 has a longitudinal axis 300 and extends coaxially through the rotor 23 of the rotary motor 20. The actuator shaft 30 is supported in this instance in the rotor 23 in a plain bearing 26 (or a linear ball bearing) so that it can be moved relative to the rotor 23 in the direction of the longitudinal axis 300 of the actuator shaft 30 (that is to say, axially). A first longitudinal end of the actuator shaft 30 facing the armature 13 of the linear motor 10 is coupled by means of a coupling 15 to the armature 13 of the linear motor 10 in terms of pulling and pushing, that is to say, in terms of axial movement, in such a manner that the linear movement of the armature 13 is transmitted directly to the actuator shaft 30. The coupling 15 is constructed in such a manner that the (still to be explained) rotational movement of the actuator shaft 30 (about its own longitudinal axis 300) is not transmitted to the armature 13.

The actuator shaft 30 is kinematically coupled to the rotor 23 of the rotary motor 20 in terms of rotation. To this end, there is provided a mechanical rotary coupling in the form of an annular carrier 27, at the inner side of which a radially inwardly protruding projection 28 is formed or arranged. The annular carrier 27 is arranged coaxially relative to the rotor 23 of the rotary motor 20 and connected to the rotor 23 in a rotationally secure manner. The projection 28 of the annular carrier 27 engages in a longitudinal groove 31 of the actuator shaft 30 that is arranged parallel to the longitudinal axis 300 of the actuator shaft 30 and slides therein when the actuator shaft 30 is moved axially by the linear motor 10. By means of the carrier 27 and the projection 28 thereof which engages in the longitudinal groove 31, the rotational movement of the rotor 23 of the rotary motor 20 is transmitted to the actuator shaft 30.

The construction of the carrier 27 and of its projection 28 as well as the construction of the actuator shaft 30 and its longitudinal groove 31 can be seen more clearly in the detailed illustrations in FIG. 5 and FIG. 6. Of course, the carrier 27 may also comprise two or more projections and the actuator shaft 30, correspondingly, may be provided with two or more longitudinal grooves. From the above explanations, it is clear that the actuator shaft 30 can be rotated by means of the rotary motor 20 about the longitudinal axis 300 and can be moved in the direction of its longitudinal axis 300 by means of the linear motor 10 so that it can carry out a combined rotary lifting movement.

The step-down gear 40 which has already been mentioned further above, which is preferably a planetary gear, is arranged at a second longitudinal end of the actuator shaft 30 opposite the first longitudinal end of the actuator shaft 30, the gear input 42 (drive side) being connected to the actuator shaft 30 in a rotationally secure manner and also in a manner secure against relative axial movement, so that both a rotational movement of the actuator shaft 30 and an axial movement of the actuator shaft 30 is transmitted to the step-down gear 40. A gear output 43 arranged coaxially opposite the gear input 42 finally forms the output both for the step-down gear 40 and for the entire rotary lifting device.

The step-down gear 40 together with its gear housing 41 is inserted into a rigid plate 50 which extends perpendicularly relative to the actuator shaft 30. The gear output 43 is constructed as a rotary plate having a large diameter and is supported in large ball bearings 44, it serves to mount a manipulation tool suitable for the respective purpose, for example, a gripper or a lever arm or the like. Due to the gear output 43 being embodied as a rotary plate having a large diameter and further due to the large ball bearings 44, large protruding load masses, such as lever arms and the like, can also be directly mounted to the gear output 43.

FIG. 7 is a sectioned illustration of significant components of the step-down gear 40, the "inner" components of the gear (toothed wheels, etcetera) not being illustrated in detail for the sake of clarity.

Due to the connection of the actuator shaft 30 to the step-down gear 40 in a secure manner against relative axial movement, the step-down gear 40 is constructed in such a manner that axial forces acting on the step-down gear 40 can be transmitted from the step-down gear 40 to the actuator shaft 30, which in turn transmits these axial forces to the armature 13 of the linear motor 10. With the aid of the linear motor 10, it is then possible to eventually compensate for such axial forces or to transfer them in the opposite direction in the event of a positional change. The load, for example, a lever arm having a gripper, can be directly coupled to the gear output 43 of the step-down gear 40. Accordingly, the step-down gear 40 is constructed in such a manner that it has an output bearing which is configured for this type of loading.

As long as the above requirements are complied with, the step-down gear 40, instead of being constructed as a planetary gear, may also be constructed as a cyclo gear or gear of another construction type, in which the gear input and the gear output are arranged in a coaxial manner. In principle, a gear construction is also conceivable in which the gear output is not arranged coaxially, asymmetric forces occurring in this instance and the rotary lifting device as a whole then having an asymmetric structure.

Mounted to the plate 50 are two rails 51 and 52 which are axially parallel with the actuator shaft 30 and which are each supported in a guide 53 and 54 in the longitudinal direction thereof and which can be displaced parallel with the longitudinal axis 300 of the actuator shaft 30. The two guides 53 and 54 are mounted at both sides to a hollow mounting block 55, which in turn is flange-mounted in a coaxial manner to the housing 21 of the rotary motor 20. Alternatively, the mounting block 55 may also be embodied as a part of the housing 21. The actuator shaft 30 extends through the hollow mounting block 55 and can additionally be supported therein in another bearing 56. The plate 50, the two rails 51 and 52 and the guides 53 and 54 are constructed in a stable manner and are rigidly connected to each other in terms of relative movement so that the plate 50 and consequently the gear housing 41 (relative to the rotary motor 20) cannot rotate, and also movement of the plate 50 or the step-down gear 40 transversely to the actuator shaft 30 is prevented. Furthermore, any tilting moments caused by the connected load or the movement thereof are absorbed via the gear housing 41 and the plate 50 as well as via the rails 51 and 52 and the guides 53 and 54 thereof by the mounting block (or the housing of the rotary motor) and optionally directed away so that they do not act on the actuator shaft 30 and the components of the rotary lifting device connected thereto. The actuator shaft 30 of the rotary lifting device is consequently not subjected to any loading caused by transverse forces or tilting moments and only must be able to transmit the torque and the axial force. Accordingly, the diameter of the actuator shaft can be optimised in terms of the requirements of the rotary lifting motor and is structurally independent of any transverse forces or tilting moments caused by the load.

The plate 50 together with the step-down gear 40 inserted therein can be moved by the linear motor 10 via the actuator shaft 30 in the direction of the longitudinal axis 300 of the actuator shaft 30. The linear movement of the actuator shaft 30 is thus transmitted to the step-down gear 40 and the plate 50. On the other hand, the actuator shaft 30 drives the step-down gear 40 in terms of rotation at the input side, the gear output 43 rotating more slowly by a factor of l/i in accordance with the step-down ratio i of the gear.

In contrast to the approach described in the introductory portion involving load adaptation by means of a step-down gear which is inserted between the linear motor and rotary motor, in the rotary lifting device according to the invention the step-down action with the factor I is not effected ahead of the mechanical rotational coupling of the rotor of the rotary motor, but rather is effected behind the mechanical rotary coupling between the rotor of the rotary motor and the actuator shaft. A number of advantages is thereby achieved, including:

the torque to be transmitted in the mechanical rotary coupling is not increased by the factor i. The mechanical rotary coupling between the rotor of the rotary motor and the actuator shaft only must be able to transmit the drive torque of the rotary motor and is located at the drive side of the step-down gear. The loading and therefore the configuration of the rotary coupling are determined by the torque to be transmitted and not by the speed. Therefore, the configuration of the rotary coupling is independent of the load adaptation and can therefore be optimised to the requirements of the specific application of the rotary lifting device.

The play of the mechanical rotary coupling (between the carrier projection and the longitudinal groove) is located ahead of the step-down gear. The play is thereby reproduced at the load reduced by the factor l/i of the step-down gear. Accordingly, a radial interference variable, for example a rotational impact acting on the load, is stepped-up by the factor i to the drive side of the gear. This is advantageous since the rotation angle sensor system in the rotary motor 20 thus receives an interference signal which is increased by the factor i and can react more quickly thereto.

The actuator shaft only must be able to transmit the torque and the linear (axial) force and is free from lateral loading (transverse forces) and tilting moments. The tilting loads which occur in particular in applications with a large lever arm are completely received by the lateral guide. However, a comparatively narrow structure of the entire rotary lifting device can be achieved nevertheless.

The diameter of the actuator shaft may be selected to be small since the actual load support is achieved by means of the step-down gear inserted in the plate and the parallel guiding of the plate or the step-down gear, respectively.

The load adaptation is carried out via the axially moved step-down gear. The mass of the step-down gear is significantly smaller than the mass of the corresponding rotary motor. In comparison with the approach mentioned in the introductory part, in which the entire rotary motor including the planetary gear is moved, significantly less mass therefore has to be moved axially.

Since the load is directly coupled to the step-down gear, the very stable output-side support of the step-down gear can be used in an optimum manner.

Since the rotary motor is not moved, no (maintenance-intensive) drag chain cables are required for the power supply and the control of the rotary motor.

The invention has been explained with reference to an embodiment, however, it is not intended to be limited to the embodiment. Instead, numerous modifications are conceivable for the person skilled in the art without departing from the teaching of the invention. The scope of protection is therefore defined by the appended patent claims.

The invention claimed is:

1. A rotary lifting device, comprising:
an actuator shaft having a longitudinal axis;
a linear motor for moving the actuator shaft in the direction of the longitudinal axis thereof; and
a rotary motor for rotating the actuator shaft about the longitudinal axis thereof;
wherein the rotary motor has a hollow rotor, through which the actuator shaft extends and which is kinematically coupled to the actuator shaft in terms of rotation;
and wherein the linear motor is arranged in a fixed manner relative to the rotary motor and has an armature, which is arranged coaxially with respect to the actuator shaft extending through the rotor of the rotary motor and which is kinematically coupled to the actuator shaft at a first longitudinal end thereof with respect to the movement of the actuator shaft in the direction of the longitudinal axis thereof;
the rotary lifting device further comprising a step-down gear;
wherein the step-down gear is arranged at a second longitudinal end of the actuator shaft and is arranged so as to be able to be moved relative to the rotary motor in the direction of the longitudinal axis of the actuator shaft;
and wherein the step-down gear is kinematically coupled to the actuator shaft at the drive side of the step-down gear, both with respect to a movement in the direction of the longitudinal axis of the actuator shaft and with respect to a rotary movement about the longitudinal axis of the actuator shaft.

2. The rotary lifting device according to claim 1, wherein the step-down gear is adapted so as to transmit axial forces to the actuator shaft.

3. The rotary lifting device according to claim 1, wherein the step-down gear comprises a gear housing, and wherein the gear housing is arranged in a rotationally secure manner relative to the rotary motor.

4. The rotary lifting device according to claim 1, wherein the step-down gear is arranged relative to the longitudinal axis of the actuator shaft in a manner resistant against transverse forces.

5. The rotary lifting device according to claim 1, wherein the step-down gear is arranged relative to the longitudinal axis of the actuator shaft in a manner resistant against tilting.

6. The rotary lifting device according to claim 1, wherein the step-down gear is arranged in a plate, which is arranged so as to be able to be moved relative to the rotary motor in the direction of the longitudinal axis of the actuator shaft.

7. The rotary lifting device according to claim 6, wherein the plate is connected to at least one rail which is arranged parallel to the longitudinal axis of the actuator shaft, with the rail being supported in at least one guide which is secured to a housing of the rotary motor, and with the rail being displaceably arranged parallel to the longitudinal axis of the actuator shaft.

8. The rotary lifting device according to claim 1, wherein the step-down gear comprises at the output side a disc or a rotary plate as an output.

9. The rotary lifting device according to claim 1, wherein the step-down gear is a planetary gear.

* * * * *